INVENTORS.
LOUIS R. BLOOM
CARL F. BUHRER
BY
R. J. Frank
ATTORNEY.

INVENTORS.
LOUIS R. BLOOM
CARL F. BUHRER
BY
R. J. Frank
ATTORNEY.

INVENTORS.
LOUIS R. BLOOM
CARL F. BUHRER
BY
R. J. Frank
ATTORNEY.

Sept. 13, 1966 L. R. BLOOM ET AL 3,272,988

POLARIZATION MODULATION SYSTEM FOR TRANSMITTING AND RECEIVING TWO INDEPENDENT SIGNALS OVER A SINGLE ELECTROMAGNETIC CARRIER

Filed March 25, 1963 4 Sheets-Sheet 4

INVENTORS.
LOUIS R. BLOOM
CARL F. BUHRER

BY R. J. Frank

ATTORNEY.

United States Patent Office 3,272,988
Patented Sept. 13, 1966

3,272,988

POLARIZATION MODULATION SYSTEM FOR TRANSMITTING AND RECEIVING TWO INDEPENDENT SIGNALS OVER A SINGLE ELECTROMAGNETIC CARRIER

Louis R. Bloom, Westbury, and Carl F. Buhrer, Hempstead, N.Y., assignors to General Telephone and Electronics Laboratories, Inc., a corporation of Delaware
Filed Mar. 25, 1963, Ser. No. 267,599
13 Claims. (Cl. 250—199)

This invention relates to signal transmission systems and in particular to a system for modulating an electromagnetic carrier with two independent signals and for separating and detecting these signals at a remote receiver.

The generation of coherent light by optical masers has stimulated interest in light communication systems. Such systems exhibit greater directivity and wider bandwidth capacity than conventional microwave channels. Using these systems, it is possible to have a number of wideband communication links operating without interference within sight of each other at nearly the same optical wavelength.

It is an object of our invention to provide a system for modulating a light beam by two independent signals and then separating and detecting these signals at a remote receiver.

Another object is to provide a system for modulating a light beam in which substantially all of the input light energy appears at the output of the modulator.

Still another object is to provide a signal transmission system in which a continuous beam of light is available for alignment of the transmitter and receiver.

As is well known, electric and magnetic fields may be employed to change the dielectric constants of many media. In some of these media, application of an electric or magnetic field causes an anisotropy to be set up such that beams (or waves) of electromagnetic radiation with the same direction of propagation but different directions of polarization travel through the media at different velocities. In particular, there will be one direction of polarization, known as the fast direction, for which the beam velocity is a maximum, while for the polarization perpendicular to this, the "slow" direction, the velocity of the beam will be a minimum. If beams of these two different polarizations start moving through the medium together, the one with the slow direction of polarization will be shifted in time phase or retarded with respect to the other. The amount of this retardation due to induced birefringence in the medium is approximately proportional to the field strength as well as to the path length in the medium.

In the present invention, a polarized beam of electromagnetic radiation having an angular frequency $\omega_c$ is directed through a polarization modulator consisting of one or more units of a medium having the characteristics described above. The modulator is provided with first and second pairs of terminals adapted to receive a first independent input signal A and a second independent input signal B. These signals modulate the beam which is then transmitted to a remote receiver where it passes through first and second polarization filters to first and second detectors respectively. The outputs of the first and second detectors are proportional to the first and second independent modulating signals.

More particularly, the radiation emerging from the modulator consists of a carrier varying at the frequency of the polarized beam and first and second pairs of sidebands which are oppositely polarized with respect to the carrier. By oppositely polarized, it is meant that if the carrier is left-circularly polarized, then the first and second pairs of sidebands are right-circularly polarized and, conversely, if the carrier is right-circularly polarized then the sidebands are left-circularly polarized. Also, if the carrier is linearly-polarized in a given direction then sidebands linearly-polarized in a direction perpendicular to the given direction are also said to be oppositely polarized.

The first pair of sidebands is proportional to the product of the first independent signal and a first component varying at the frequency of the carrier. The second pair of sidebands is proportional to the product of the second independent signal and a second component varying at the frequency of the first component but in phase quadrature therewith. For example, if the carrier is propagated in a direction normal to a plane defined by orthogonal $x$–$y$ axes and is linearly polarized in the $x$ direction, then it can be expressed as $$E_x=E_c \cos \omega_c t \qquad (1)$$
$$E_y=0$$

where $E_x$ and $E_y$ are the magnitudes of the carrier in the $x$ and $y$ directions, $E_c$ is the amplitude of the carrier, and $t$ is time. The radiation emerging from the polarization modulator due to the first independent signal A alone has a first pair of sidebands $$E_{xa}=0 \qquad (2)$$
$$E_{ya}=E_c m \cos \omega_a t \cos \omega_c t$$

where $m$ is a constant and $\omega_a$ is the angular frequency of the first independent signal A. Thus, the first pair of sidebands is polarized in the $y$ direction and is therefore orthogonally polarized with respect to the carrier. The term "pair of sidebands" is used because the expression for $E_{ya}$ can be expanded to $$E_c m/2[\cos (\omega_c-\omega_a)t+\cos (\omega_c+\omega_a)t] \qquad (3)$$

where $\omega_c-\omega_a$ is the lower sideband frequency and $\omega_c+\omega_a$ is the upper sideband frequency.

Similarly, the radiation emerging from the modulator due to the second independent signal B alone has a second pair of sidebands:

$$E_{xb}=0 \qquad (4)$$
$$E_{yb}=E_c m \cos \omega_b t \sin \omega_c t$$

where $\omega_b$ is the angular frequency of the second independent signal. As in the case of the first pair of sidebands, the second pair of sidebands is orthogonally polarized with respect to the carrier but the component varying at the frequency of the carrier ($\sin \omega_c t$) is in phase quadrature with the component ($\cos \omega_c t$) appearing in the expression for the first pair of sidebands.

As the first modulating signal A varies through one cycle, the polarization of the output beam remains linear while oscillating about the input orientation. However, as the second modulating signal B varies through one cycle, the output resulting from this signal becomes elliptically polarized with a sense of rotation dependent upon the modulating voltage polarity, the major and minor axes of the ellipse remaining fixed. When the two signals are both applied to the modulator, the orientation and ellipticity of the output beam vary in accordance with both signals. (The ellipticity of the ellipse is defined as the ratio of its minor to its major axes.)

Similar relationships are obtained if the carrier is circularly polarized. Thus, assuming the carrier to be left-circularly polarized it can be expressed as $$E_x=E_c \cos \omega_c t \qquad (5)$$
$$E_y=E_c \sin \omega_c t$$

The first pair of sidebands then has components polarized in the $x$ and $y$ directions $$E_{xa}=E_c m \cos \omega_a t \sin \omega_c t \quad (6)$$
$$E_{ya}=E_c m \cos \omega_a t \cos \omega_c t$$

and the second pair of sidebands has components $$E_{xb}=E_c m \cos \omega_b t \cos \omega_c t \quad (7)$$
$$E_{yb}=-E_c m \cos \omega_b t \sin \omega_c t$$

The first modulating signal causes the output to become elliptically polarized with major and minor axes at 45 degrees to the $x$ and $y$ directions whereas the second modulating signal causes the output to become elliptically polarized with major and minor axes along the $x$ and $y$ axes.

At the receiver, the modulated beam passes through first and second polarization filters positioned side by side in the beam. The radiation emerging from the first polarization filter consists of a carrier and third and fourth pairs of sidebands. The third pair of sidebands is proportional to the product of the first independent signal and a third component varying at the frequency of the carrier. The fourth pair of sidebands is proportional to the product of the second independent signal and a fourth component varying at the frequency of the carrier, the third component being in phase with the carrier and the fourth component being in phase quadrature with the carrier.

The radiation emerging from the second polarization filter also consists of the carrier and the third and fourth pairs of sidebands. However, in the radiation emerging from the second polarization filter the third component is in phase quadrature with the carrier and the fourth component is in phase with the carrier.

The first and second detectors are positioned to receive the radiation emerging from the first and second polarization filters respectively. These detectors produce an output proportional to the intensity of the radiation striking them. As shall be shown, the output of the first detector is proportional to the first independent signal, and the output of the second detector is proportional to the second independent signal.

The system described is particularly suitable for modulation of a polarized light beam by two independent signals and for the subsequent separation and detection of these signals at a receiver. One class of devices which may be used to modulate the polarized light beam comprises crystals of electro-optic materials; i.e. materials in which the desired variation of light velocity with polarization direction is produced by an electric field. In one crystal of this class, an electric field perpendicular to the direction of light propagation produces a retardation of light polarized in the fast direction with respect to light polarized in the slow direction. This retardation is proportional to the field strength and to the length of the light path in the crystal. Such a crystal is said to exhibit a dual transverse electro-optic effect and has a 3-fold rotation axis in its point group.

In some crystals of this type, the 3-fold rotation axis in the point group corresponds to a 3-fold rotation axis in the crystal; in others it corresponds to a 3-fold screw axis in the crystals. A 3-fold rotation axis may be defined as an axis of symmetry existing in a crystal such that, after rotation about the axis through 120°, the crystal assumes a congruent position. A crystal with a 3-fold screw axis assumes a congruent position when the 120° rotation is advanced by a translation along the axis of rotation. A point group is one of the 32 crystallographically permissible symmetries involving sets of rotation axes and planes of symmetry all of which intersect in a common point. Further information on the geometrical features of crystals and the notation used to describe them may be obtained by reference to the textbook, "Elementary Crystallography," by M. J. Buerger, published by John Wiley & Sons, Inc., New York, 1956.

The polarized light beam is directed through the electro-optic crystal in a direction parallel to a 3-fold symmetry axis. A first pair of electrodes extending parallel to the 3-fold axis is secured to opposite sides of the crystal and a second pair of electrodes is affixed to opposite sides of the crystal midway between the first pair of electrodes. A first independently varying voltage is applied directly across the first pair of electrodes, and a second independently varying voltage is applied directly across the second pair of electrodes. Passage of polarized light through the energized electro-optic crystal does not alter its total intensity but does modulate the polarization state of the beam.

Another type of electro-optic crystal which may be used to produce polarization modulation of a light beam are crystals such as potassium dihydrogen phosphate $$(KH_2PO_4)$$

which are of tetragonal structure and therefore optically uniaxial. In a modulator using crystals of this type, the first and second signal voltages are applied directly to first and second suitably oriented crystals to produce electric fields parallel to the light beam and along the optic axes of the crystals.

Another type of modulator utilizes Faraday rotator cells and is responsive to signals which produce magnetic fields across the cells in the direction of light propagation.

If the light carrier transmitted to the receiver is circularly polarized, the first and second polarization filters may be plane polarizers oriented at 45° to each other. If the carrier is plane polarized, a quarter-wave plate is placed in front of one of the polarizers. Also, the light loss caused by the polarizers may be avoided by replacing them with polarizing prisms and providing two detectors for each prism.

The above objects of and the brief introduction to the present invention will be more fully understood and further objects and advantages will become apparent from a study of the following description in connection with the drawings, wherein.

Figures 6, 9:
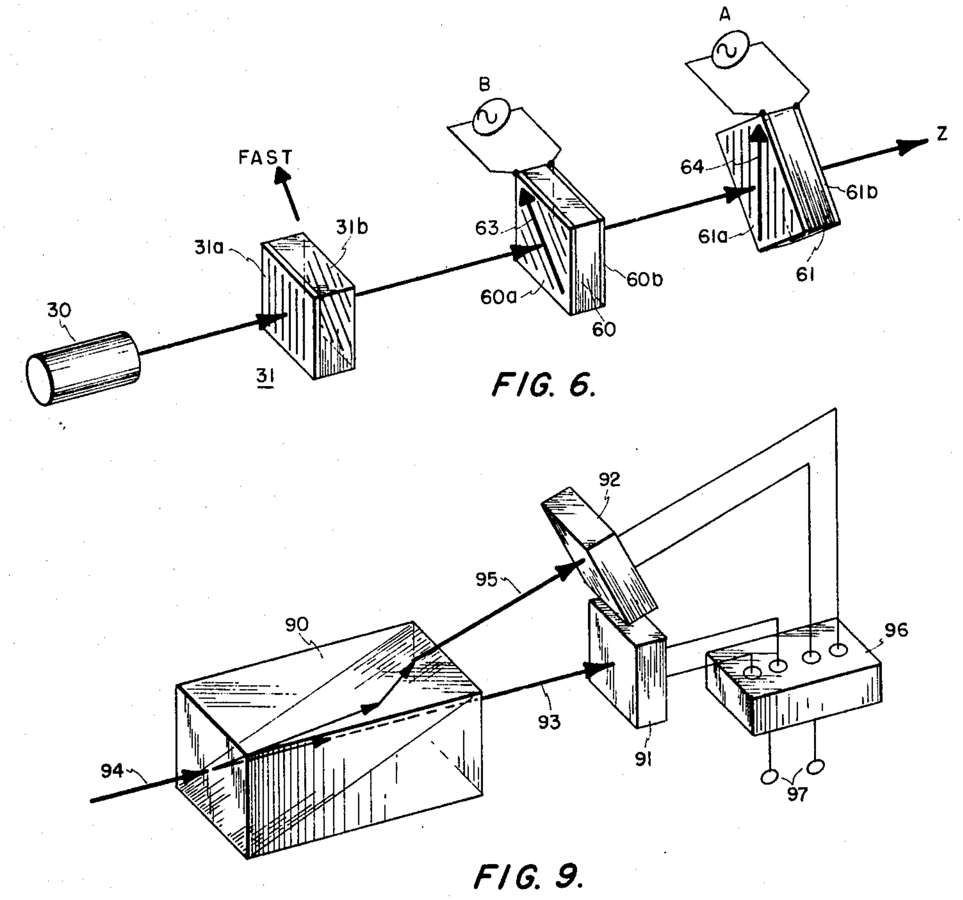
Figure 2:
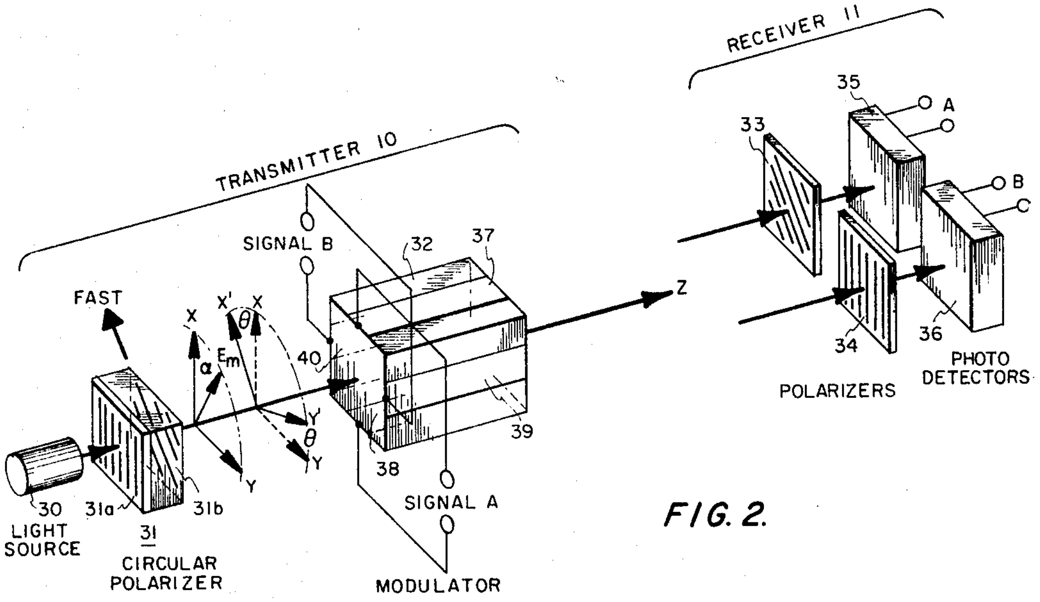
FIG. 2 is a schematic diagram showing one form of transmission system in which the modulator consists of a single crystal and the transmitted carrier is circularly polarized.
Figure 3:
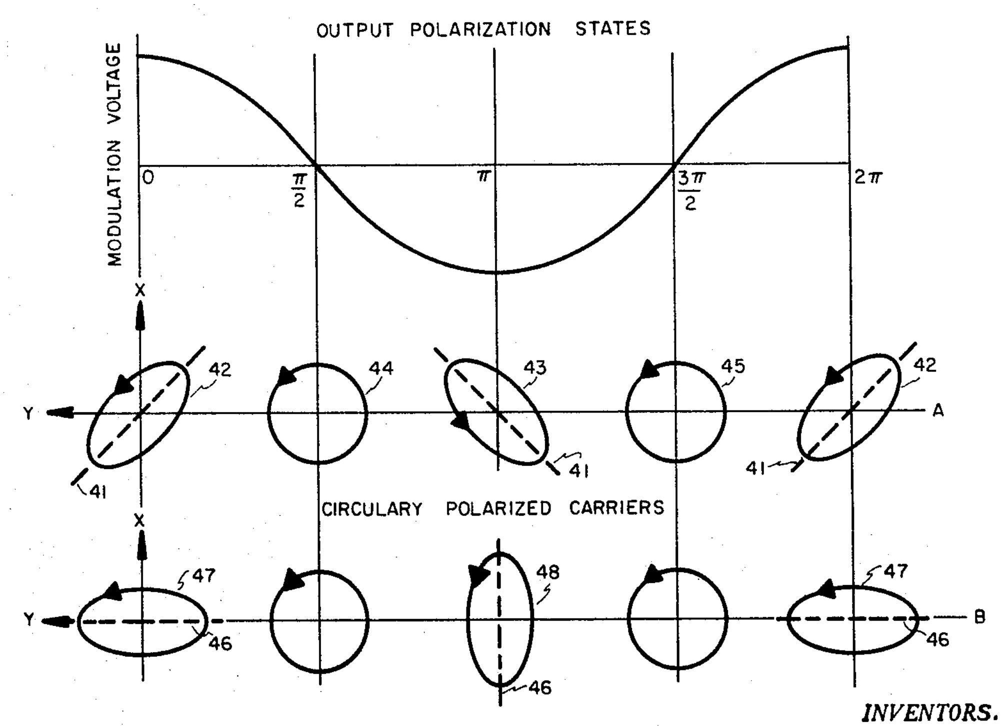
Figure 4:
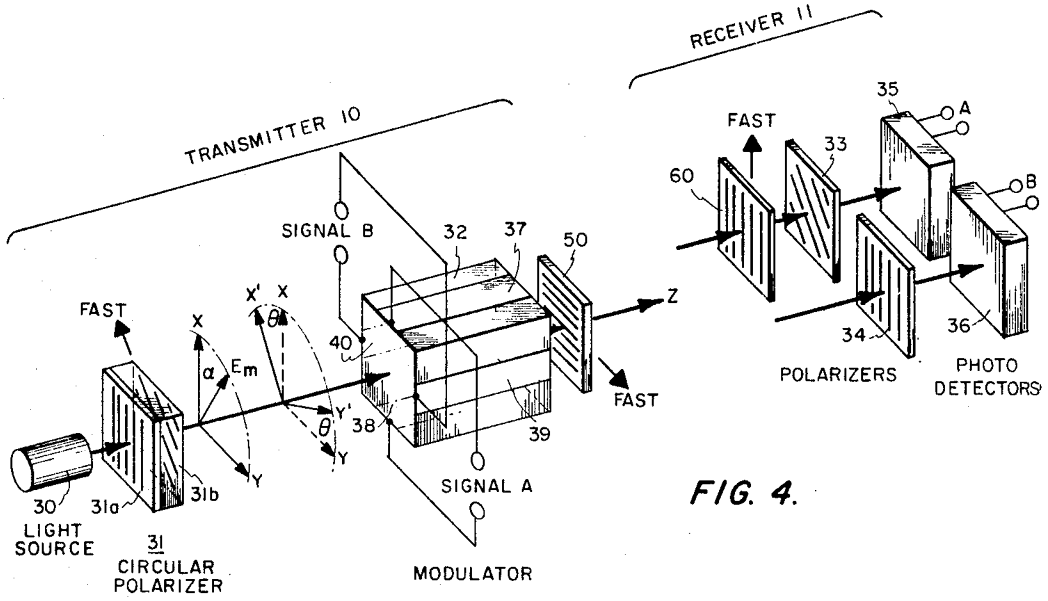
Figure 5:
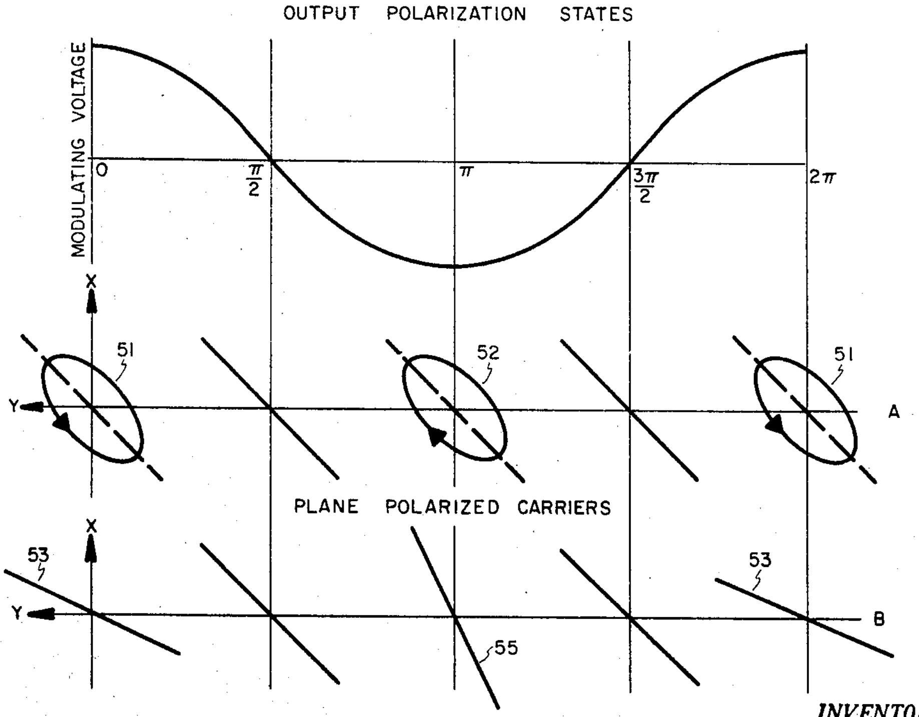
Figure 7:
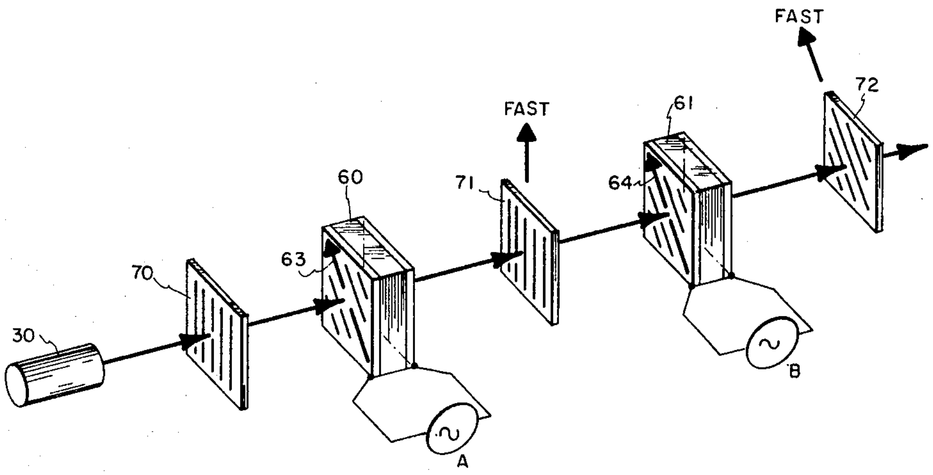
Figure 8:
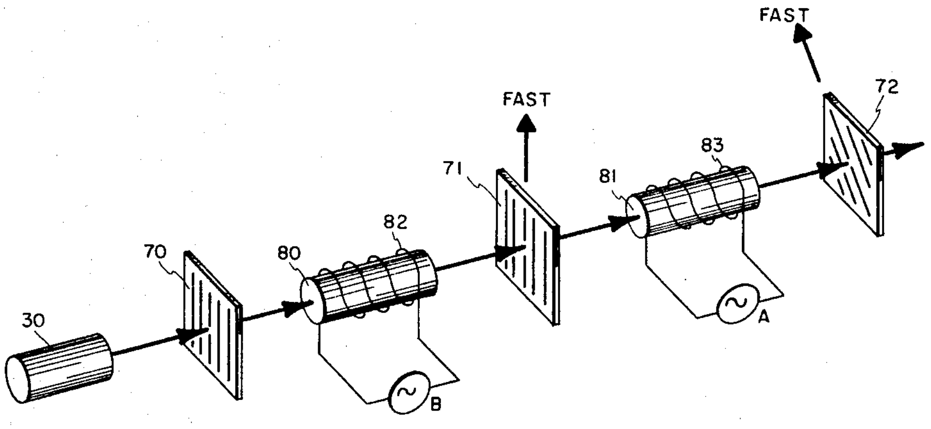

FIG. 3 indicates the polarization states of the light at the output of the transmitter of FIG. 2;

FIG. 4 is a schematic diagram of a transmission system using a single crystal modulator in which the transmitted carrier is linearly polarized;

FIG. 5 indicates the polarization states of the light at the output of the transmitter of FIG. 4;

FIG. 6 shows a schematic diagram of a transmitter in which the single crystal modulators of FIGS. 2 and 4 have been replaced by two crystals;

FIG. 7 illustrates a modification of the transmitter of FIG. 6;

FIG. 8 is a modification of the transmitter of FIG. 7 in which the electro-optic crystals have been replaced by Faraday cells, and FIG. 9 is a modified polarization filter and detector for use with the receiver of FIGS. 2 and 4.

Figure 1:
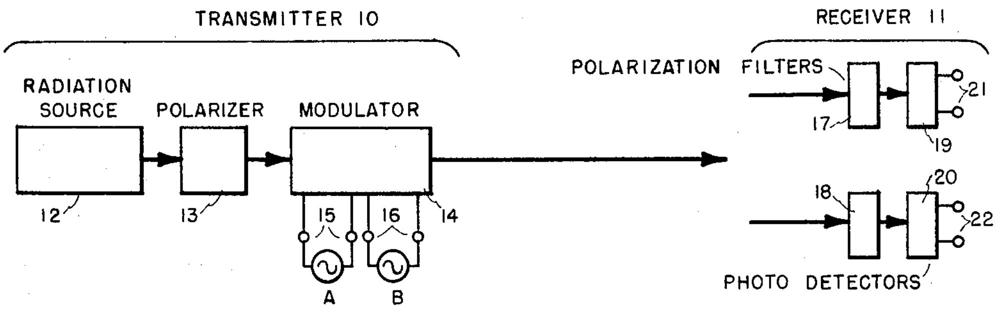
FIG. 1 is a block diagram depicting a dual polarization modulation transmission system.

Referring to FIG. 1, there is shown a block diagram of a transmission system comprising a transmitter 10 for modulating a beam of polarized radiation by two independently varying signals and a receiver 11 for separating and detecting these signals. The transmitter 10 includes a radiation source 12, a polarizer 13 and a modulator 14. The modulator 14 is provided with a first pair of terminals 15 for receiving a first independently varying applied signal A and a second pair of terminals 16 for receiving a second independently varying applied signal B. These signals may be related to each other or they may be completely unrelated. Their waveforms can be simply sinusoids or they may be complex waves including modulated sub-carriers. The radiation emerging from the modulator consists of a carrier varying at the frequency of the polarized beam and first and second pairs of sidebands which are oppositely polarized with respect to the carrier. At the remote receiver 11, the beam strikes polarization filters 17 and 18. In the radiation emerging from filter 17, only signal A appears as amplitude modulation of the carrier and is therefore detected by photocell 19. Similarly, polarization filter 18 is so oriented that only signal B appears as amplitude modulation and therefore only this signal is detected by photocell 20. The voltage appearing across the output terminals 21 of photocell 19 is proportional to signal A and the voltage appearing across the output terminals 22 of photocell 20 is proportional to signal B.

FIG. 2 shows a polarization modulation system in which the transmitter 10 includes a light source 30, a left-circular polarizer 31, and an electro-optic crystal 32. The receiver 11 includes plane polarizers 33 and 34 and photocells 35 and 36. Transmitter 10 and receiver 11 are shown near each other for clarity although, in an actual system, they would be some distance apart. In the event the receiver is so close to the transmitter that the beam has not widened sufficiently to permit the polarizers 33 and 34 to be placed side by side in the beam, then a conventional beam splitter positioned in the path of the incoming light may be used to divert the beam to both polarizers.

Source 30 may be any non-coherent light source such as a sodium vapor lamp. Alternatively, a coherent light source such as an optical maser may be used, a gaseous type suitable for this application being described in detail in U.S. Patent No. 3,183,937 granted May 18, 1965 to Kenneth D. Earley et al.

The light from source 30 is propagated in the $+z$ direction through left circular polarizer 31 which consists of a plane polarizer 31*a* positioned to transmit light with its electric vector oriented along the $x$ axis in the transverse $x$–$y$ plane and a quarter-wave birefringent plate 31*b* having its fast polarization direction in the $x$–$y$ plane in a direction at 45° to the $-x$ and $+y$ axes. (It shall be noted that if the light emitted by the optical maser is plane polarized, a quarter-wave birefringent plate may be substituted for the circular polarizer 31.)

Plane polarizer 31*a* may be made of any material exhibiting dichroism such as tourmaline or Polaroid. The quarter-wave birefringent plate 31*b* may consist of a thin sheet of split mica or quartz cut parallel to its optic axes and having a thickness which produces a 90° relative phase shift between light components in the $x$–$y$ plane at +45° and −45° from the $x$ axis. With the described orientation of plane polarizer 31*a* and birefringent plate 31*b*, the light entering electro-optic crystal 32 is circularly polarized in the left-hand direction; i.e. looking toward polarizer 31 from crystal 32 the electric vector of the electromagnetic wave rotates counter-clockwise as the light is propagated in the $+z$ direction.

Electro-optic crystal 32 has a 3-fold symmetry axis extending in the direction of light propagation $+z$. As has been explained, light propagating in a given direction through the crystal under the influence of an electric field has a velocity which is dependent upon the direction of polarization of the light. The polarization direction for which the light has a maximum velocity (the fast direction) is that in which the refractive index of the crystal is a minimum, and the direction for which the light has minimum velocity (the slow direction) is that in which the refractive index is a maximum. These directions are at right angles to each other and are perpendicular to the direction of light propagation.

A first independently varying signal voltage A is connected directly to longitudinally extending electrodes 37 and 38 located on opposite sides of crystals 32 and a second independently varying signal voltage B is connected to longitudinally extending electrodes 39 and 40. Electrodes 39 and 40 are opposite each other and located midway between electrodes 37 and 38. The electric fields $E_A$ and $E_B$ produced by voltages A and B respectively are perpendicular to each other and therefore the total field $E_m$ due to these voltages is $$E_m=(E_A^2+E_B^2)^{1/2} \qquad (8)$$

At a given instant, the field $E_m$ may be considered to have a direction $\alpha$ measured from the vertical $+x$ direction.

The light emerging from polarizer 31 is left circularly polarized in a right hand coordinate system and may be expressed as $$E_x=E_c \cos \omega_c t \qquad (9)$$
$$E_y=E_c \sin \omega_c t$$

Due to the symmetry of the electro-optic effect in a crystal having a 3-fold symmetry axis, it can be shown that for light traveling along the 3-fold axis the retardation $\varphi$ is proportional to the magnitude of the transverse field $E_m$ while the orientation of the fast polarization direction depends on the direction of the transverse electric field. The fast polarization direction is assumed to be along $x'$ when the electric field $E_m$ is at an angle $\alpha$ from $x$, the $x$ and $y$ directions being chosen such that $x'$ coincides with $x$ for $\alpha=0$. Under these conditions, the angle $\theta$ between $x$ and $x'$ is equal to $-\alpha/2$.

After traversing the crystal, the electric vector of light in the $x$ and $y$ directions is $$E_x=E_c\left[\cos\frac{\varphi}{2}\cos\omega_c t-\frac{A}{E_m}\sin\frac{\varphi}{2}\sin\omega_c t-\frac{B}{E_m}\sin\frac{\varphi}{2}\cos\omega_c t\right] \qquad (10)$$

$$E_y=E_c\left[\cos\frac{\varphi}{2}\sin\omega_c t-\frac{A}{E_m}\sin\frac{\varphi}{2}\cos\omega_c t+\frac{B}{E_m}\sin\frac{\varphi}{2}\sin\omega_c t\right]$$

The first terms in the expressions for $E_x$ and $E_y$ correspond to the left circularly polarized carrier reduced in amplitude by cos $\varphi/2$ indicating that the sideband energy appears at the expense of the carrier in the modulation process. The second and third terms in $E_x$ and $E_y$ correspond to two right circularly polarized vibrations differing in time phase by 90°.

The polarization states resulting from sinusoidal modulation by voltages A or B are shown in FIG. 3. The ellipses represent the loci of points taken by the positive end of the electric vector of the light wave during one optical cycle as the oncoming beam is viewed emerging from crystal 32. With only signal A applied, the major axis 41 of the ellipse extends between the $+x$, $-y$, and $-x$, $+y$ quadrants when the signal voltage is positive and between the $+x$, $+y$ and $-x$, $-y$ quadrants when the signal voltage is negative as shown at 42 and 43 respectively.

With zero voltage across 37 and 38, the light is left circularly polarized as shown at 44 and 45. Similarly, when a sinusoidal voltage B is applied between electrodes 39 and 40, the major axis 46 of the ellipse extends along the $y$ axis for a positive voltage and along the $x$ axis for a negative voltage as indicated at 47 and 48. With both voltages A and B applied, the output light varies both in ellipticity and orientation.

Crystal 32 may be made of any optically transparent material, such as sphalerite zinc sulphide (ZnS), which contains a 3-fold rotation axis in its point group and which exhibits a transverse linear electro-optic effect upon light traveling along this axis. Crystal classes whose symmetry elements include one or more 3-fold rotation axes occur in the cubic, hexagonal and trigonal systems.

In cubic crystals, the [111] directions are 3-fold rotation axes. Using the symbols employed in the International Union of Crystallography by the Kynock Press, Birmingham (England) (1952), cubic crystals belonging to point groups 23 and $\bar{4}3m$ can exhibit the desired electro-optic behavior. Cubic crystals are optically isotropic and therefore when no field is applied they are not birefringent for any direction of light propagation.

The other classes of crystals, i.e. point groups, possessing 3-fold rotation axes are uniaxial with the optic axes parallel to the 3-fold axis. These classes comprise the two hexagonal point groups $\bar{6}$ and $\bar{6}m2$, each characterized by a 6-fold inversion axis which includes a 3-fold rotation axis. In addition, all non-centrosymmetric classes of the trigonal system, 3, 32 and 3*m*, may be employed.

In the process of polarization modulation, no light absorbing elements are involved and therefore the beam intensity is substantially constant. Detection by a photocell insensitive to the polarization state would give no information recovery and polarization filters are needed at the receiver 11. Examination of the polarization states of FIG. 3 and of Equations 10 indicates that if plane polarizer 33 is oriented at 45° to $x$ and $y$ shown in FIG. 2 it will pass $$E_{xy}=\frac{E_c}{2^{1/2}}[(1+kA)(\cos\omega_c t+\sin\omega_c t)+kB(\cos\omega_c t-\sin\omega_c t)] \quad (11)$$

in which only signal A is present as amplitude variations. In Equation 11, $k$ is equal to $\varphi/2E_m$ and $\varphi$ is assumed approximately equal to $\sin\varphi$. Photocell 35 responds to the intensity of the plane polarized light emerging from filter 33 and produces an output $$I_{x,y}=|E_{x,y}|^2=E_c^2\left(1-\frac{A}{E_m}\sin\varphi\right)\cong E_c^2(1-2kA)$$
$$(12)$$
$$I_{x,y}=|E_{x,-y}|^2=E_c^2\left(1+\frac{A}{E_m}\sin\varphi\right)\cong E_c^2(1+2kA)$$

Signal A can also be received with polarizer 33 oriented at 45° to $x$ and $y$ but all other orientations result in the detection of a combination of the A and B signals.

Similarly, plane polarizer 34 oriented along the $x$ axis passes only signal B as amplitude modulation for detection by photocell 36. The output of this photocell is $$I_x=|E_x|^2=E_c^2\left(1-\frac{B}{E_m}\sin\varphi\right)\cong E_c^2(1-2kB) \quad (13)$$
$$I_y=|E_y|^2=E_c^2\left(1+\frac{B}{E_m}\sin\varphi\right)\cong E_c^2(1+2kB)$$

Signal B can also be received with plane polarizer 34 oriented along the $y$ axis but again, all other orientations result in the detection of combinations of the A and B signals. Thus, use of a photocell preceded by a plane polarizer oriented along either $x$ or $y$ results in detection of signal B; use of a photocell preceded by a plane polarizer oriented at 45° to $x$ results in detection of signal B. Conversion from one channel to the other is achieved by a 45° rotation of the polarizer.

FIG. 4 illustrates a polarization modulation system which is similar to that of FIG. 2 except that the circularly polarized carrier is linearly polarized by a quarter-wave plate 50 having its fast direction parallel to the $y$ axis. The light emerging from plate 50 can be expressed as $$E_x=E_c\left[\cos\frac{\varphi}{2}\cos\omega_c t-\frac{A}{E_m}\sin\frac{\varphi}{2}\sin\omega_c t-\frac{B}{E_m}\sin\frac{\varphi}{2}\cos\omega_c t\right]$$

$$E_y=E_c\left[\cos\frac{\varphi}{2}\cos\omega_c t+\frac{A}{E_m}\sin\frac{\varphi}{2}\sin\omega_c t+\frac{B}{E_m}\sin\frac{\varphi}{2}\cos\omega_c t\right] \quad (14)$$

The first terms of Equations 14 represent the carrier linearly polarized at 45° to the $x$ direction, the second and third terms represent the modulated components linearly polarized at −45° to the $x$ direction and differing by 90° in phase.

The polarization states resulting from application of signal A only and signal B only are shown in FIG. 5. With only signal A applied between electrodes 37 and 38, the major axis of the ellipse is oriented at 45° to $x$ and $y$ regardless of the polarity of the signal as shown at 51 and 52. With no signal applied, the ellipse degenerates to a line at 45° to $x$ and $y$. When only signal B is applied to electrodes 39 and 40 the output is plane polarized, rotating counterclockwise for positive signals as shown at 53 and clockwise for negative signals as indicated at 55. Again, as in the case of the circularly polarized carrier the output light varies both in ellipticity and orientation when both fields A and B are applied.

The quarter-wave birefringent plate 50, which converts the circularly polarized output (Equation 10) to the linearly polarized output (Equation 14), affects the relative phases but not the amplitudes of the $x$ and $y$ components. Thus, plane polarizer 34 oriented along either the $x$ or $y$ directions permits detection of signal B by photocell 36. Quarter-wave plate 50, however, converts the components linearly polarized at $-x$ into circularly polarized components whose amplitudes are given by Equation 13. Therefore, a quarter-wave plate 60, having its fast direction in the $x$ direction is interposed between plane polarizer 33 and the transmitter to permit detection of signal A by photocell 35.

In applications where the receiver may rotate slightly about the beam axis, the system of FIG. 4 affords more certain separation of the two signals than does operation with a circularly polarized carrier. This is because the operation of the circular polarizer required for detection of signal A is independent of rotation about the axis. Rotation of the plane polarizer required for detection of signal B from the optimum orientation reduces the intensity of signal B at the photocell but does not produce mixing of signal A with signal B.

FIG. 6 illustrates a modification of the transmitter shown in FIGS. 2 and 4 in which two optically uniaxial potassium dihydrogen phosphate ($KH_2PO_4$) crystals 60 and 61 are substituted for the single crystal 32. The crystals 60 and 61 are oriented so that the light emerging from circular polarizer 31 is propagated along their [001] optic axes. Electrodes 60*a* and 60*b* are secured to opposite faces of crystal 60. Signal source B is connected directly to electrodes 60*a* and 60*b* and signal source A is connected dirtctly to electrodes 61*a* and 61*b*. Circular polarizer 31 may have any orientation normal to the $z$ axis. The induced polarization directions [110 or 1$\bar{1}$0] (shown by arrows 63 and 64) of crystals 60 and 61 are displaced 45° about the $z$ axis. With signal sources A and B varying independently, the light emerging from crystal 61 comprises a polarization modulated circularly polarized carrier and can be detected by the receiver shown in FIG. 2. By placing a quarter-wave plate after crystal 61 with its fast direction parallel to the $y$ axis, the carrier is plane polarized and the receiver shown in FIG. 4 may be used.

FIG. 7 depicts a modification of the transmitter of FIG. 6. In this form of the transmitter, the fast polarization directions 63 and 64 of crystals 60 are 61 are each oriented at 45° to the polarization axis of plane polarizer 70. A quarter-wave plate 71 having its fast axis parallel to the polarization direction of plane polarizer 70 is interposed between crystals 60 and 61 and a quarter-wave plate 72 having its fast axis at 45° to the polarization direction of plane polarizer 70 is placed at the output of crystal 61. With signal sources A and B varying independently, the light emerging from quarter-wave plate 72 consists of a polarization modulated circularly polarized carrier and can be detected by the receiver shown in FIG. 2. If plate 72 is omitted, the light emerging from crystal 51 consists of a polarization modulated linearly polarized carrier similar to that shown in FIG. 5.

FIG. 8 shows a modified transmitter for modulating a light beam emitted by source 30. In this transmitter, the light from source 30 is plane polarized by polarizer 70 and transmitted through first and second axially spaced Faraday rotator cells 80 and 81. Faraday cells 80 and 81 have coils 82 and 83 wound thereon, the ends of coils 82 and 83 being connected directly across independently varying voltage sources B and A respectively. The applied voltages B and A produce magnetic fields directed along the direction of the light beam axis in cells 80 and 81 thereby causing the axis of polarization of the light traversing the cells to be rotated through an angle proportional to the strength of the corresponding magnetic fields.

A quarter-wave plate 71 having its fast direction parallel to the plane of polarization of the plane polarized incident beam is interposed between cells 80 and 81. A second quarter-wave 72 having its fast direction 45° to the plane of polarization of the incident plane polarized beam is positioned in the beam emerging from rotator cell 81. Thus, quarter-wave plate 72 converts the polarization of the carrier emerging from rotator cell 81 from linear polarization to circular polarization.

In FIG. 9 there is shown a device for receiving a light signal 94 having horizontally and vertically polarized components and for detecting these components. The horizontally polarized component 93 is separated from the input signal 94 by the birefringent prism 90. The vertically polarized component 95 is deviated and reflected by an interface in the prism to photocell 92 whose output is 180° out of phase with that from photocell 91. The outputs of photocells 91 and 92 are added in network 96, the voltage appearing across output terminals 97 being proportional to signal B.

As many changes could be made in the above construction and many different embodiments could be made without departing from the scope thereof, it is intended that all matter contained in the above description or shown in the accompanying drawings shall be interpreted as illustrative and not in a limiting sense.

What is claimed is:

1. A signal transmission system for modulating a polarized beam of electromagnetic radiation by first and second independent signals and for detecting said signals, said system comprising (a) modulation means positioned in the path of said polarized beam, said modulation means having first and second inputs for receiving said first and second independent signals; the radiation emerging from said modulation means consisting of a carrier varying at the frequency of said polarized beam and first and second pairs of sidebands oppositely polarized with respect to said carrier, said first pair of sidebands being proportional to the product of said first independent signal and a first component varying at the frequency of said carrier, and said second pair of sidebands being proportional to the product of said second independent signal and a second component varying at the frequency of said first component but in phase quadrature therewith, (b) a first polarization filter positioned in the path of the beam emerging from said modulation means, the radiation emerging from said first polarization filter consisting of a carrier and third and fourth pairs of sidebands, said third pair of sidebands being proportional to the product of said first independent signal and a third component varying at the frequency of said carrier and in phase therewith, said fourth pair of sidebands being proportional to the product of said second independent signal and a fourth component varying at the frequency of said carrier and in phase quadrature therewith, (c) a second polarization filter positioned in the path of the beam emerging from said modulation means, the radiation emerging from said second polarization filter including said carrier and said third and fourth pairs of sidebands, said third pair of sidebands being in phase quadrature with said carrier and said fourth pair of sidebands being in phase with said carrier, and (d) first and second detector means, said first detector means being positioned to receive the radiation emerging from said first polarization filter and said second detector means being positioned to receive the radiation emerging from said second polarization filter, the output of said first detector means being proportional to said first independent signal and the output of said second detector means being proportional to said second independent signal.

2. A signal transmission system for modulating a polarized input light beam by first and second independent signals and for detecting said signals, said system comprising (a) modulation means positioned in the path of said polarized input light beam, said modulation means having first and second inputs for receiving said first and second independent signals; the modulated light beam emerging from said modulation means consisting of a carrier varying at the frequency of said polarized input light beam and first and second pairs of sidebands oppositely polarized with respect to said carrier, said first pair of sidebands being proportional to the product of said first independent signal and a first component varying at the frequency of said carrier, and said second pair of sidebands being proportional to the product of said second independent signal and a second component varying at the frequency of said first component but in phase quadrature therewith, (b) a first polarization filter positioned in the path of said modulated light beam, the light emerging from said first polarization filter consisting of a carrier and third and fourth pairs of sidebands, said third pair of sidebands being proportional to the product of said first independent signal and a third component varying at the frequency of said carrier and in phase therewith, said fourth pair of sidebands being proportional to the product of said second independent signal and a fourth component varying at the frequency of said carrier and in phase quadrature therewith, (c) a second polarization filter positioned in the path of said modulated light beam, the light emerging from said second polarization filter including said carrier and said third and fourth pairs of sidebands, said third pair of sidebands being in phase quadrature with said carrier and said fourth pair of sidebands being in phase with said carrier, and (d) first and second detector means, said first detector means being positioned to receive the light emerging from said first polarization filter and said second detector means being positioned to receive the light emerging from said second polarization filter, the output of said first detector means being proportional to said first independent signal and the output of said second detector means being proportional to said second independent signal.

3. A signal transmission system for modulating a polarized input light beam by first and second independent signals and for detecting said signals, said system comprising (a) modulation means positioned in the path of said polarized input light beam, said modulation means including at least one electro-optic crystal and having first and second inputs for receiving said first and second independent signals, the modulated light beam emerging from said modulation means consisting of a carrier varying at the frequency of said polarized input light beam and first and second pairs of sidebands oppositely polarized with respect to said carrier, said first pair of sidebands being proportional to the product of said first independent signal and a first component varying at the frequency of said carrier, and said second pair of sidebands being proportional to the product of said second independent signal and a second component varying at the frequency of said first component but in phase quadrature therewith, (b) a first polarization filter positioned in the path of said modulated light beam, the light emerging from said first polarization filter consisting of a carrier and third and fourth pairs of sidebands, said third pair of sidebands being proportional to the product of said first independent signal and a third component varying at the frequency of said carrier and in phase therewith, and said fourth pair of sidebands being proportional to the product of said second independent signal and a fourth component varying at the frequency of said carrier and in phase quadrature therewith, (c) a second polarization filter positioned in the path of said modulated light beam, the light emerging from said second polarization filter including said carrier and said third and fourth pairs of sidebands, said third pair of sidebands being in phase quadrature with said carrier and said fourth pair of sidebands being in phase with said carrier, and (d) first and second detector means, said first detector means being positioned to receive the light emerging from said first polarization filter and said second detector means being positioned to receive the light emerging from said second polarization filter, the output of said first detector means being proportional to said first independent signal and the output of said second detector means being proportional to said second independent signal.

4. A signal transmission system for modulating an input light beam by first and second independent signals and for detecting said signals, said system comprising (a) a light source, (b) means for polarizing the beam emitted by said light source, (c) modulation means poistioned in the path of said polarized input light beam, said modulation means including at least one electro-optic crystal and having first and second inputs for receiving said first and second independent signals, the modulated light beam emerging from said modulation means consisting of a carrier varying at the frequency of said polarized input light beam and first and second pairs of sidebands oppositely polarized with respect to said carrier, said first pair of sidebands being proportional to the product of said first independent signal and a first component varying at the frequency of said carrier, and said second pair of sidebands being proportional to the product of said second independent signal and a second component varying at the frequency of said first component but in phase quadrature therewith, (d) a first polarization filter positioned in the path of said modulated light beam, the light emerging from said first polarization filter consisting of a carrier and third and fourth pairs of sidebands, said third pair of sidebands being proportional to the product of said first independent signal and a third component varying at the frequency of said carrier and in phase therewith, and said fourth pair of sidebands being proportional to the product of said second independent signal and a fourth component varying at the frequency of said carrier and in phase quadrature therewith, (e) a second polarization filter positioned in the path of said modulated light beam, the light emerging from said second polarization filter including said carrier and said third and fourth pairs of sidebands, said third pair of sidebands being in phase quadrature with said carrier and said fourth pair of sidebands being in phase with said carrier, and (f) first and second detector means, said first detector means being positioned to receive the light emerging from said first polarization filter and said second detector means being positioned to receive the light emerging from said second polarization filter, the output of said first detector means being proportional to said first independent signal and the output of said second detector means being proportional to said second independent signal.

5. A signal transmission system for modulating a polarized input light beam by first and second independent voltages and for detecting said voltages, said system comprising (a) an electro-optic crystal having a 3-fold rotation axis in its point group, said beam being directed through said crystal parallel to said axis, (b) first, second, third and fourth electrodes affixed to the surface of said crystal, said electrodes extending in a direction parallel to the 3-fold rotation axis and being symmetrically disposed thereabout, said first and second electrodes being oppositely located and said third and fourth electrodes being oppositely located, (c) means for applying said first voltage directly across said first and second electrodes, (d) means for applying said second voltage directly across said third and fourth electrodes, the modulated light beam emerging from said electro-optic crystal consisting of a carrier varying at the frequency of said polarized input light beam and first and second pairs of sidebands oppositely polarized with respect to said carrier, said first pair of sidebands being proportional to the product of said first independent signal and a first component varying at the frequency of said carrier, and said second pair of sidebands being proportional to the product of said second independent signal and a second component varying at the frequency of said first component but in phase quadrature therewith, (e) a first polarization filter positioned in the path of said modulated light beam, the light emerging from said first polarization filter consisting of a carrier and third and fourth pairs of sidebands, said third pair of sidebands being proportional to the product of said first independent signal and a third component varying at the frequency of said carrier and in phase therewith, and said fourth pair of sidebands being proportional to the product of said second independent signal and a fourth component varying at the frequency of said carrier and in phase quadrature therewith, (f) a second polarization filter positioned in the path of said modulated light beam, the light emerging from said second polarization filter including said carrier and said third and fourth pairs of sidebands, said third pair of sidebands being in phase quadrature with said carrier and said fourth pair of sidebands being in phase with said carrier, and (g) first and second detector means, said first detector means being positioned to receive the light emerging from said first polarization filter and said second detector means being positioned to receive the light emerging from said second polarization filter, the output of said first detector means being proportional to said first independent signal and the output of said second detector means being proportional to said second independent signal.

6. A signal transmission system for modulating an input light beam by first and second independent voltages and for detecting said voltages, said system comprising (a) a light source,
(b) circularly polarizing means, said means circularly polarizing the light beam emitted by said light source,
(c) an electro-optic crystal having a 3-fold rotation axis in its point group, said beam being directed through said crystal parallel to said axis,
(d) first, second, third and fourth electrodes affixed to the surface of said crystal, said electrodes extending in a direction parallel to the 3-fold rotation axis and being symmetrically disposed thereabout, said first and second electrodes being oppositely located and said third and fourth electrodes being oppositely located, a plane through said first and second electrodes defining a first transverse direction and a plane through said third and fourth electrodes defining a second transverse direction perpendicular to said first direction,
(e) means for applying said first independent voltage directly across said first and second electrodes and means for applying said second independent voltage directly across said third and fourth electrodes, the light emerging from said electro-optic crystal having a circularly polarized carrier,
(f) a first linear polarizer positioned in the path of the beam emerging from said electro-optic crystal, said first linear polarizer having a direction of polarization midway between said first and second transverse directions,
(g) a second linear polarizer positioned in the path of the beam emerging from said electro-optic crystal, said second linear polarizer having a direction of polarization along said first direction,
(h) first and second detector means, said first detector means being positioned to receive the light emerging from said first linear polarizer and said second detector means being positioned to receive the light emerging from said second linear polarizer, the output of said first detector means being proportional to said first independent voltage and the output of said second detector means being proportional to said second independent voltage.

7. A signal transmission for modulating an input light beam by first and second independent voltages and for detecting said voltages, said system comprising
(a) a light source,
(b) first circularly polarizing means, said means circularly polarizing the light beam emitted by said light source,
(c) an electro-optic crystal having a 3-fold rotation axis in its point group, said beam being directed through said crystal parallel to said axis,
(d) first, second, third and fourth electrodes affixed to the surface of said crystal, said electrodes extending in a direction parallel to the 3-fold rotation axis and being symmetrically disposed thereabout, said first and second electrodes being oppositely located and said third and fourth electrodes being oppositely located, a plane through said first and second electrodes defining a first transverse direction and a plane through said third and fourth electrodes defining a second transverse direction perpendicular to said first direction,
(e) means for applying said first independent voltage directly across said first and second electrodes and means for applying said second independent voltage directly across said third and fourth electrodes,
(f) a quater-wave plate positioned in the beam emerging from said electro-optic crystal with its fast direction along said second direction, the light emerging from said quarter-wave plate having a linearly polarized carrier,
(g) second circularly polarizing means, said means being positioned in the path of the linearly polarized beam emerging from said quarter-wave plate for circularly polarizing said beam, (h) a linear polarizer positioned in the path of the beam emerging from said second quarter-wave plate, said linear polarizer having a direction of polarization along said first direction, and
(i) first and second detector means, said first detector means being positioned to receive the light emerging from said second circularly polarizing means and said second detector means being positioned to receive the light emerging from said linear polarizer, the output of said first detector means being proportional to said first independent voltage and the output of said second detector means being proportional to said second independent voltage.

8. The signal transmission system defined by claim 7 wherein said second circularly polarizing means comprises a quarter-wave plate having its fast direction along said first direction and a linear polarizer having a direction of polarization midway between said first and second transverse directions interposed between said quarter-wave plate and said first detector means.

9. A signal transmission system for modulating a circularly polarized input light beam by first and second independent voltages and for detecting said voltages, said system comprising
(a) first and second axially spaced electro-optic crystals having their optic axes parallel to the direction of said light beam and their induced polarization directions displaced about the beam axis with respect to each other by 45°,
(b) first and second electrodes secured to opposite faces of said first electro-optic crystal and third and fourth electrodes secured to opposite faces of said second electro-optic crystal, said first, second, third and fourth electrodes producing fields along the optic axes of said first and second crystals,
(c) means for applying said second independent voltage directly across said first and second electrodes and means for applying said first independent voltage directly across said third and fourth electrodes,
(d) first and second linear polarizers positioned in the path of the beam emerging from said electro-optic crystals, said first and second linear polarizers having directions of polarization parallel to the fast directions of polarization of said first and second electro-optic crystals respectively, and
(e) first and second detector means, said first detector means being positioned to receive the light emerging from said first linear polarizer and said second detector means being positioned to receive the light emerging from said second linear polarizer, the output of said first detector means being proportional to said first independent voltage and the output of said second detector means being proportional to said second independent voltage.

10. In a signal transmission system for modulating an incident plane polarized light beam by first and second independent voltages and for detecting said voltages, a transmitter comprising
(a) first and second axially spaced electro-optic crystals, the induced polarization directions of said first and second crystals being displaced 45° about the beam axis from the direction of polarization of said plane polarized incident beam,
(b) first and second electrodes secured to opposite faces of said first electro-optic crystal and third and fourth electrodes secured to opposite faces of said second electro-optic crystal,
(c) means for applying said first voltage directly across said first and second electrodes and means for applying said second voltage directly across said third and fourth electrodes, and
(d) a quarter-wave plate having its fast direction parallel to the plane of polarization of said plane polarized incident beam interposed between said crystals, the light emerging from said second electro-optic crystal having a linearly polarized carrier.

11. In a signal transmission system for modulating an incident plane polarized light beam by first and second independent voltages and for detecting said voltages, a transmitter comprising (a) first and second axially spaced electro-optic crystals, the induced polarization directions of said first and second crystals being displaced 45° about the beam axis from the direction of polarization of said plane polarized incident beam, (b) first and second electrodes secured to opposite faces of said first electro-optic crystal and third and fourth electrodes secured to opposite faces of said second electro-optic crystal, (c) means for applying said first voltage directly across said first and second electrodes and means for applying said second voltage directly across said third and fourth electrodes, said second voltage varying independently of said first voltage, (d) a first quarter-wave plate having its fast direction parallel to the plane of polarization of said plane polarized incident beam interposed between said crystals, and (e) a second quarter-wave plate having its fast direction parallel to the induced polarization directions of said first and second crystals positioned in the beam emerging from said second electro-optic crystal, the light emerging from said second quarter-wave plate having a circularly polarized carrier.

12. In a signal transmission system for modulating an incident plane polarized light beam by first and second independent signals and for detecting said signals, a transmitter comprising (a) first and second axially spaced Faraday rotator cells located along the axis of said plane polarized light beam, (b) first and second coils wound about said first and second rotator cells, (c) means for applying said first and second signals across said first and second coils respectively, said signals producing first and second magnetic fields along the light beam in said first and second rotator cells respectively, the axis of polarization of the light traversing each of said cells being rotated through an angle proportional to the strength of the corresponding magnetic fields, (d) a first quarter-wave plate having its fast direction parallel to the plane of polarization of said plane polarized incident beam interposed between said cells, the light emerging from said second rotator cell having a linearly polarized carrier, and (e) a second quarter-wave plate having its fast direction 45° to the plane of polarization of said incident plane polarized light beam positioned in the beam emerging from said second cell, the light emerging from said second quarter-wave plate having a circularly polarized carrier.

13. In a signal transmission system for modulating a light beam by first and second independent signals and for detecting said signals, a receiver comprising (a) a polarizing prism for receiving a light signal having horizontally and vertically polarized components, one of said components being transmitted along a first path in said prism and the other of said components being transmitted along a second path in said prism, (b) first and second photocells positioned in the paths of said first and second components respectively, and (c) means for combining the output of said first and second photocells, the output of said means being proportional to one of said independent signals.

References Cited by the Examiner

UNITED STATES PATENTS

| | | | |
|---|---|---|---|
| 2,263,316 | 11/1941 | Ryan | 88—65 X |
| 2,707,749 | 5/1955 | Mueller | 250—199 |
| 3,204,104 | 8/1965 | Banrid et al. | 250—199 |

FOREIGN PATENTS

| | | |
|---|---|---|
| 132,858 | 9/1919 | Great Britain. |

DAVID G. REDINBAUGH, *Primary Examiner.*

JOHN W. CALDWELL, *Examiner.*